United States Patent [19]

Hasebe et al.

[11] Patent Number: 4,513,377
[45] Date of Patent: Apr. 23, 1985

[54] VEHICLE-MOUNTED NAVIGATOR

[75] Inventors: Koshi Hasebe, Anjo, Japan; Kunio Miura, Okazaki; Takashi Ono, Kariya; Kazushi Akutsu, Kariya; Kazuaki Minami, Kariya, all of Japan

[73] Assignee: Nippondenso Co., Ltd., Kariya, Japan

[21] Appl. No.: 386,267

[22] Filed: Jun. 8, 1982

[30] Foreign Application Priority Data

Jun. 11, 1981 [JP] Japan ................................ 56-90626
Jun. 15, 1981 [JP] Japan ................................ 56-91949

[51] Int. Cl.³ ..................... G06F 15/50; G09B 29/10
[52] U.S. Cl. ................................... 364/449; 364/424; 364/521; 353/12; 343/451; 340/990; 340/995; 73/178 R
[58] Field of Search ............. 364/424, 443, 444, 449, 364/521, 571; 353/11, 12; 343/450–453; 73/178 R; 340/988–990, 992, 995, 996, 709

[56] References Cited

U.S. PATENT DOCUMENTS

| 4,086,632 | 4/1978 | Lions | 340/995 |
| 4,139,889 | 2/1979 | Ingels | 364/424 |
| 4,312,577 | 1/1982 | Fitzgerald | 353/12 |
| 4,367,453 | 1/1983 | Kuno et al. | 340/995 |
| 4,400,780 | 8/1983 | Nagao et al. | 340/988 |
| 4,428,057 | 1/1984 | Setliff et al. | 343/451 |

FOREIGN PATENT DOCUMENTS 55-159299  4/1980  Japan .

*Primary Examiner*—Gary Chin
*Attorney, Agent, or Firm*—Cushman, Darby & Cushman

[57] ABSTRACT

In a vehicle-mounted navigator, a control unit reads map data from a memory unit and displays a corresponding road map on a CRT display unit. In response to signals from a distance sensor and a direction sensor, the present position in relation to the running of the automotive vehicle is computed to display by superimposition the present position on the road map display of the display unit. When the computed present position has reached to a predetermined portion of an adjacent area, the map data of the road map adjacent to the road map on display is read from the memory unit and a corresponding road map is displayed on the display unit manually or automatically. In accordance with this updated display, the present position display is moved to a corresponding position on the updated road map display.

10 Claims, 16 Drawing Figures

FIG. 11
| 11 | 12 | 13 | 14 | 15 |
| 21 | 22 | 23 | 24 | 25 |
| 31 | 32 | 33 | 34 | 35 |
| 41 | 42 | 43 | 44 | 45 |
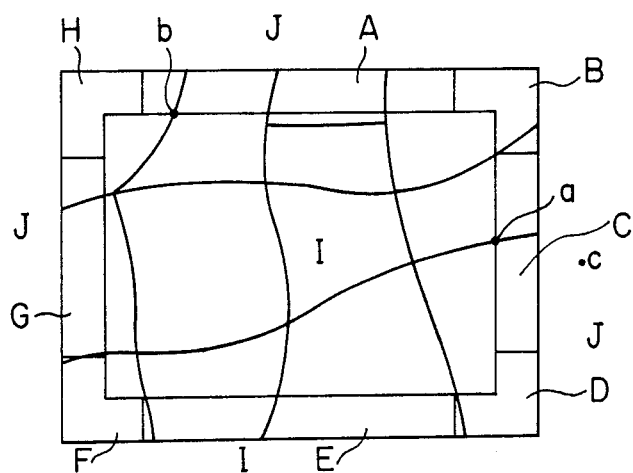
FIG. 12
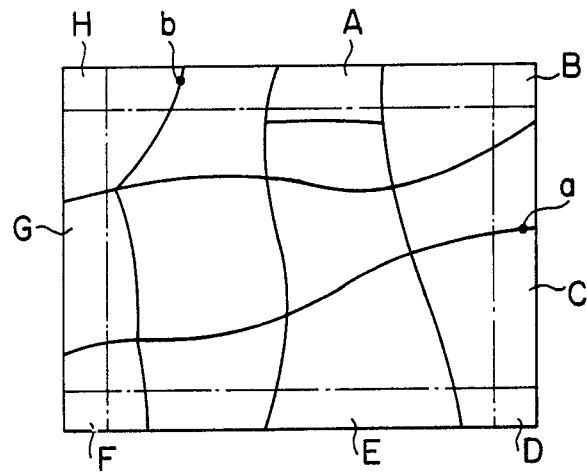
FIG. 15

VEHICLE-MOUNTED NAVIGATOR

The present invention relates to a vehicle-mounted navigator for displaying the present position of an automotive vehicle on the display panel of a road map.

A conventional apparatus of this type is disclosed in Japanese Patent Laid-Open No. 159299/80 entitled "Vehicle Running Position Display Apparatus", which comprises a distance sensor for detecting the running distance coverage of an automotive vehicle and a direction sensor for detecting the running direction thereof thereby to indicate the present running position of the automotive vehicle on the display panel of a road map of a display unit.

In this conventional apparatus, the road map display uses a transparent film printed with a road map covering the present running area of the vehicle, and therefore, in switching to a road map covering an adjacent area, a corresponding transparent film is required to be selected and replaced with the present transparent film by very troublesome operating procedures.

The present invention has been developed in view of the above-mentioned problem, and an object thereof is to provide a vehicle-mounted navigator comprising memory means for storing map data for displaying a road map of a specific area and map data of road maps of a plurality of areas adjacent to the specific area, distance sensor means, direction sensor means, decision means for deciding that a computed present position has reached an adjacent area in response to signals from the distance sensor means and the direction sensor means, and means for reading the map data on the adjacent area and displaying a corresponding road map anew on display means, thereby switching the display of the road map of a specific area to the display of the road map of an adjacent area covering the present running position of the automotive vehicle automatically or manually.

Other objects, features and advantages of the present invention will be readily apparent from the following description taken in conjunction with the accompanying drawings, in which:

FIG. 11 is a diagram for explaining the relation between the map numbers of a plurality of areas;

FIG. 12 is a diagram for explaining the operation of the present invention;

FIG. 15 is another diagram for explaining the operation of the present invention.

Figure 1:
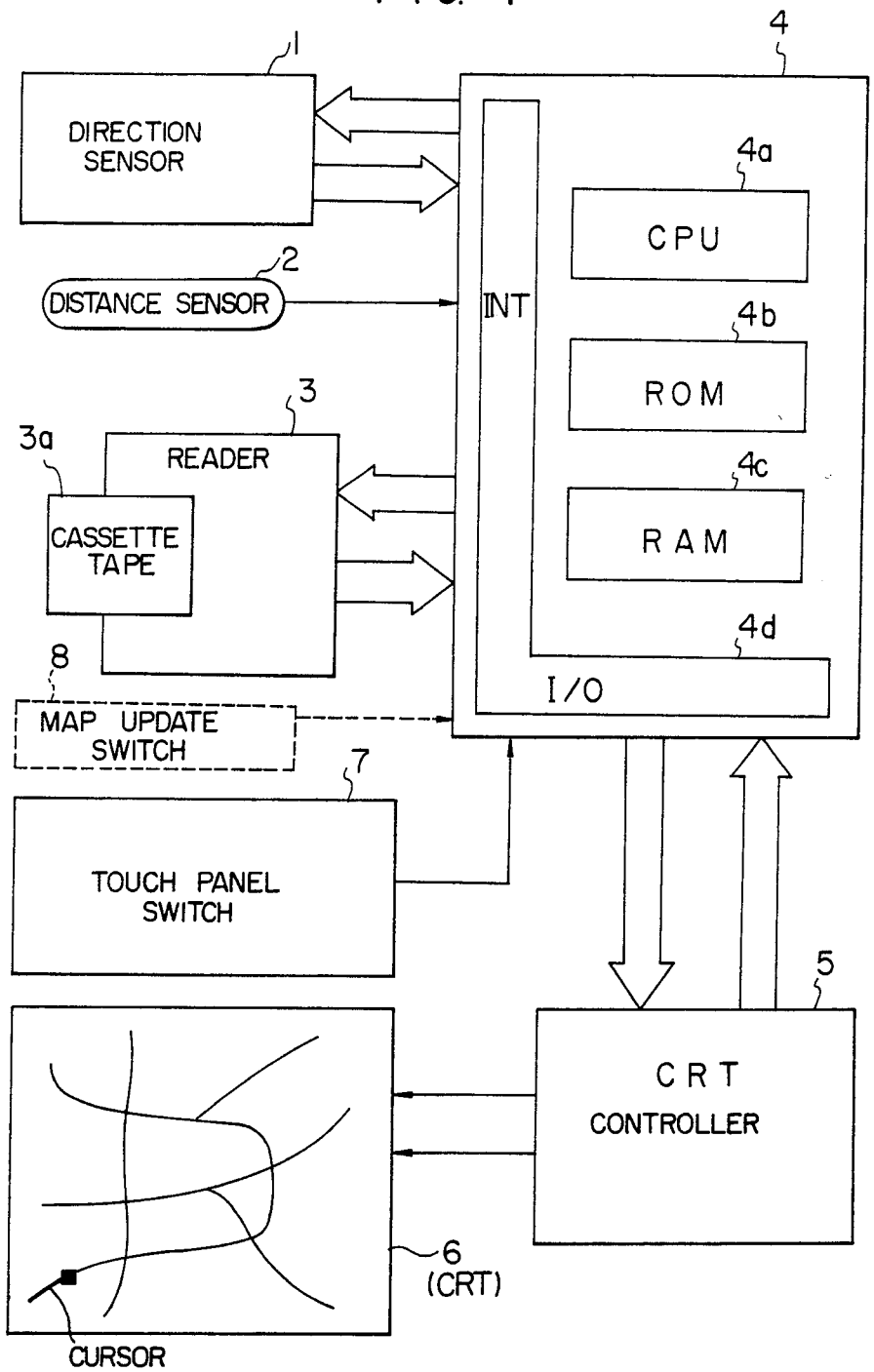
FIG. 1 shows a general configuration of an embodiment of the present invention.

Embodiments of the present invention will be described below with reference to the accompanying drawings. FIG. 1 shows a general configuration of a first embodiment. In FIG. 1, reference numeral 1 designates a direction sensor comprising direction sensor units for detecting the X and Y components of earth magnetism corresponding to the running direction of an automotive vehicle and an A/D converter for converting a signal from the direction sensor units into a digital signal, thus producing digital signals of the X and Y components corresponding to the running direction of the vehicle. Numeral 2 designates a distance sensor for producing a distance pulse for each unit distance coverage (such as about 39.2 cm) of the automotive vehicle. Numeral 3 designates a reader for searching and for reading the map data on a specific area from a cassette tape 3a providing memory means storing map data on a plurality of areas (including absolute coordinate data of a reference point at the upper right corner of each map) upon the setting thereof.

Numeral 4 designates a microcomputer for executing the digital processing operation according to a predetermined control program, and includes a CPU 4a, a ROM 4b, a RAM 4c and an I/O circuit 4d. In response to digital signals of X and Y components from the direction sensor 1, a distance pulse from the distance sensor 2 and a read signal from the reader 3, the microcomputer 4 executes a processing operation, thus producing a display signal for displaying the map of a specific area and data on the running route. The RAM 4c is always backed up in power supply from the vehicle-mounted battery independently of on-off operation of the key switch.

Numeral 5 designates a cathode-ray tube (CRT) controller, which stores map data for a specific area, data on the running route and character data separately from each other in response to a display signal from the microcomputer 4 on the one hand and generates a video signal and a sync. signal for displaying the stored map data and the running route data or the character data on a CRT on the other hand. Numeral 6 designates a CRT display unit for displaying on a CRT the map of a specific area and the running route or character data in response to a video signal and a sync. signal from the CRT controller 5. Numeral 7 designates a touch panel switch mounted on the screen of the CRT display unit 6, which touch panel divided into 12 touch areas so that when one of the 12 touch areas is touched, a corresponding serial signal is generated. The reader 3, the microcomputer 4 and the CRT controller 5 constitute control means.

Figure 2:
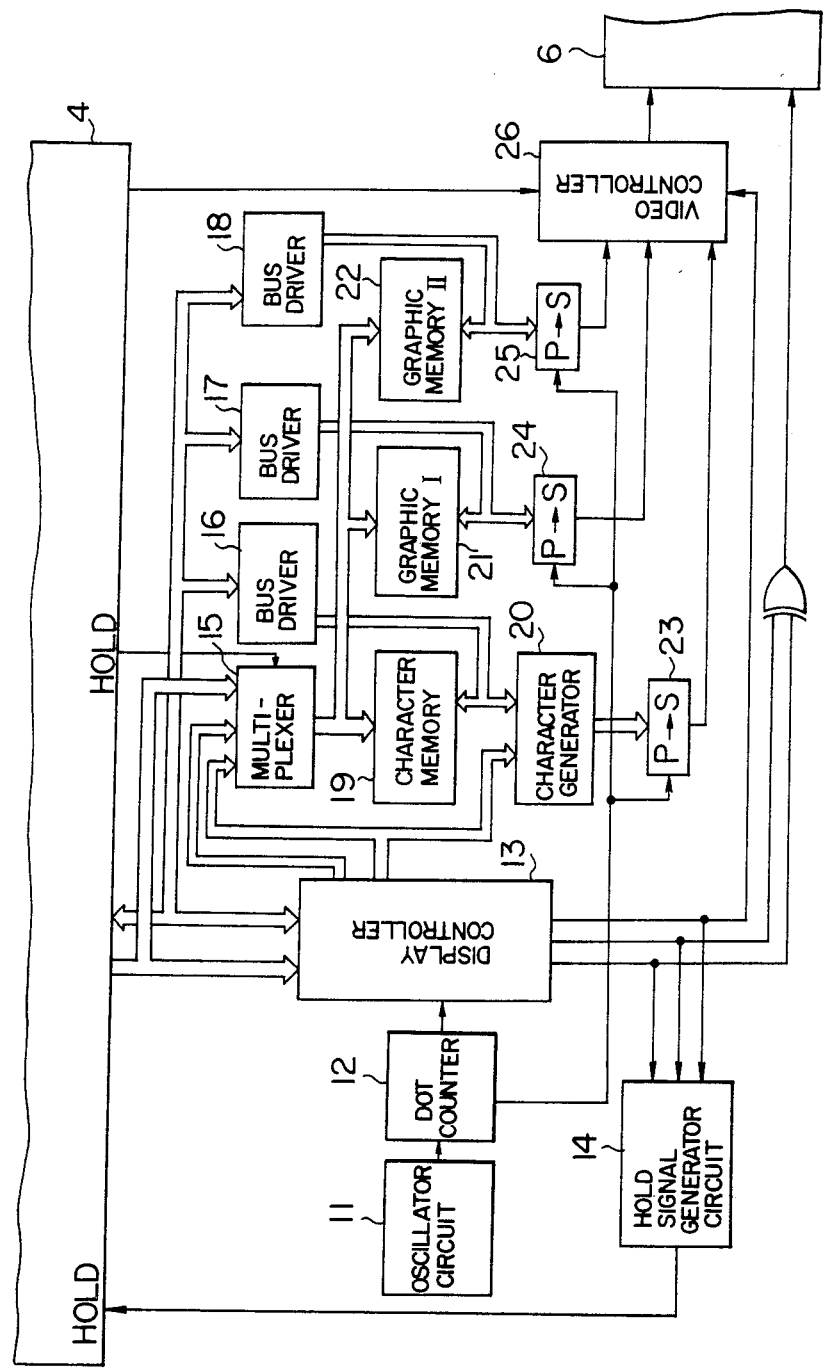
FIG. 2 is a diagram showing a detailed electrical connection of a CRT controller included in FIG. 1.

Now, the detailed electric connection diagram of the CRT controller 5 shown in FIG. 2 will be explained. Numeral 11 designates an oscillator circuit for generating an oscillation signal of 12.096 MHz, numeral 12 a dot counter for frequency-dividing the oscillation signal from the oscillator circuit 11 and generating a dot timing clock of 6.048 MHz and a character timing clock of 756 KHz. Numeral 13 designates a display controller for generating horizontal and vertical sync signals, a display timing signal, refresh memory address signal and a raster address signal in response to a command from the microcomputer 4 and the character timing clock from the dot counter 12. Numeral 14 designates a hold signal generator circuit for generating a hold signal at the hold terminal of the microcomputer 4 for holding the microcomputer 4 during the display period in response to the horizontal and vertical sync. signals from the display controller 13. Numeral 15 designates a multiplexer for switching the address signal from the microcomputer 4 and the raster signal and the refresh memory address signal from the display controller 13 in response to a hold acknowledge HOLDA) signal from the microcomputer 4. Numerals 16, 17, 18 designate bus drivers having a tristate for switching the direction of data between the microcomputer 4 and the display memory. Numeral 19 designates a character memory for storing the display data such as ASCII code from the microcomputer 4 on the one hand and receiving and producing as an address the content of the refresh memory address signal from the display controller 13 on the other hand. Numeral 20 designates a character generator for producing a display pattern in response to the raster address signal from the display controller 13 and the display address from the character memory 19. Numeral 21 designates a first graphic memory for storing map data supplied from the microcomputer 4. Numeral 22 designates a second graphic memory for storing the running route data (the running locus data and the present position data) from the microcomputer 4. Numerals 23, 24, 25 designate parallel-serial converters for converting the parallel signals from the character generator 20 and the first and second graphic memories 21 and 22 into serial data in response to the dot timing clock from the dot counter 12. Numeral 26 designates a video controller which switches the receipt of the signals from the parallel-serial converter 23 and the parallel-serial converters 24, 25 for selecting a graphic image and a character image in response to an image switching signal from the microcomputer 4 and producing a video signal in response to a display timing signal from the display controller 13. Numeral 27 designates an exclusive OR circuit for generating a sync. signal in response to the horizontal and vertical sync signals from the display controller 13. The character memory 19, the first and second graphic memories 21, 22 are always backed up in power supply by the vehicle-mounted battery.

Specifically, the CRT controller 5 is such that in response to the data supplied from the microcomputer 4, the character data is stored all the time in the character memory 19, the map data is stored all the time in the first graphic memory 21 and the running locus and the present position display data are stored all the time in the second graphic memory 22, and in response to an image switching signal from the microcomputer 4, the graphic image (for displaying the running locus and the present position on the map) or the character image (for displaying a designated character for designating an area) is selected, thereby generating a video signal and a sync. signal in the CRT dislay unit 6 for displaying on the CRT an image corresponding to the selection.

Figure 3:
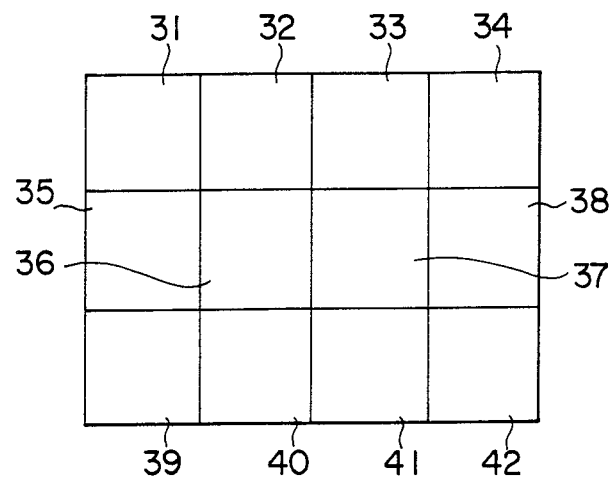
FIG. 3 is a diagram for explaining touch areas of a touch panel.
Figure 4:
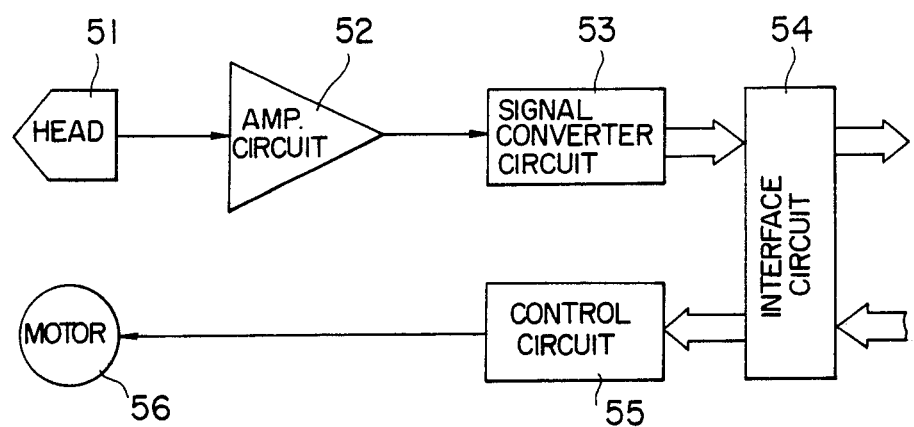
FIG. 4 is a diagram showing a detailed construction of a reader.

The touch panel 7 is divided into, as shown in FIG. 3, twelve touch areas from 31 to 42, and includes 2 sheets of glass and transparent conductor films formed in a matrix on respective glass sheets. When a specific touch area is depressed, the displacement of the glass sheet and the resulting contact of the transparent conductor film permits the detection of the particular touch area. A touch signal generator circuit not shown generates a serial signal (including a start signal and a touch data signal) corresponding to the detected touch area. The touch signal generator circuit generates a serial signal of the prevailing touch data at intervals of 40 msec. A detailed construction of the reader 3 is shown in FIG. 4. Numeral 51 designates a magnetic head for reading data from the cassette tape 3a, numeral 52 an amplifier circuit for amplifying the signal read from the magnetic head 51, numeral 53 a signal converter circuit for converting the signal produced from the amplifier circuit 52 into a digital signal, numeral 54 an interface circuit with the microcomputer 4, numeral 55 a control circuit for controlling the motor 56 in response to a control signal received from the microcomputer 4, and numeral 56 the motor. The reader 3 having this construction controls the motor 56 by the signal produced from the microcomputer 4, reads the map information and map data from the cassette tape 3a by the magnetic head 31, and applies the data (information) to the microcomputer 4 through the interface circuit 54.

Figure 5:
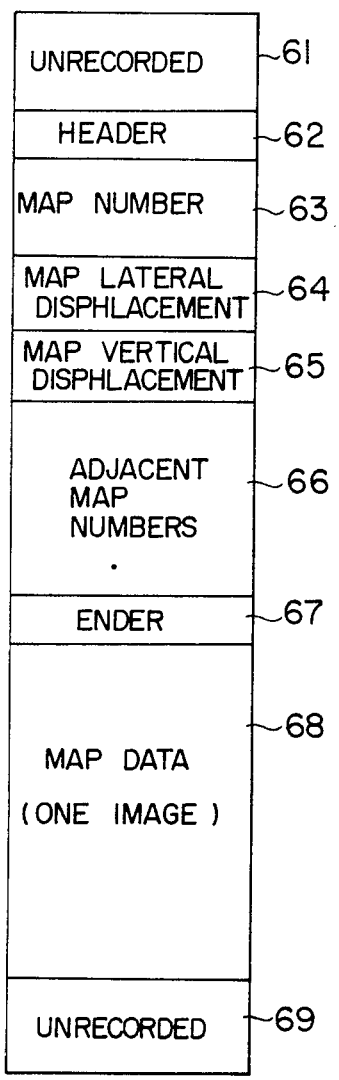
FIG. 5 is a diagram for explaining data sections of a cassette tape.

FIG. 5 shows data sections corresponding to an area in the cassette tape 3a. Numerals 61, 69 designate unrecorded sections, numeral 63 a map number section for storing the map number of this area, numerals 64, 65 a map lateral displacement section and a map vertical displacement section respectively for storing the absolute coordinate of the upper right corner of the map of this area as the data on the lateral displacement (along X axis) and the vertical displacement (along Y axis). Numeral 66 designates an adjacent map number section storing the map numbers of adjacent eight areas. The sections 63 to 66 provide map information which is discriminated from the data of the other sections by a header 62 and an ender 67. Numeral 68 designates a map data section for storing map data for displaying the road map (for one image) of this area. The data (information) of this map data section 68 and the map information section are read by the reader 3 thereby to apply such data as the map data, the absolute coordinate and the adjacent map numbers of the particular area to the microcomputer 4.

The operation of this apparatus having the above-mentioned construction will be explained with reference to FIG. 6, the flowcharts of FIGS. 7 to 10, the area number diagram of FIG. 11 and the map display diagram of FIG. 12. FIG. 7 shows a flowchart of the general processing operation, FIG. 8 a flowchart of the processing operation of the interruption processing routine based on the distance pulse from the distance sensor 2, FIG. 19 a flowchart of a detailed processing operation of the mode processing routine in FIG. 7, FIG. 10 a flowchart of a detailed processing operation of the present position computing routine in FIG. 7.

Assume that the key switch of the automotive vehicle having the component elements 1 to 7 shown in FIG. 1 is turned on to start the driving thereof. Each electrical system is actuated by power supplied from a battery mounted on the vehicle. The microcomputer 4 is actuated by the stabilization voltage of 5 V supplied from the stabilization voltage power supply circuit. The processing operation is started from the start step 100 in FIG. 7, and the process is advanced to the initialization routine 200 thereby to initialize the register means, counter means and latch means in the microcomputer 4 as required for starting the processing operation. After the initialization, the mode processing routine 300 and the present position computing routine 400 are executed repeatedly in cycles of several tens of msec.

In the mode processing routine 300, the map mode or the character mode is selected, and the data of the mode thus selected is displayed on the CRT, so that if the map mode is selected, a cursor indicating the present position is made movable, while if the character mode is selected, the processing operation permitting the designation of the map of a specific area is executed, followed by the present position computing routine 400. At the present position computing routine 400, the present position data and the running locus data in the graphic memory 22 of the CRT controller 5 are changed with the running change of ±50 m for each of X and Y components, followed by the return to the mode processing routine 300. Subsequently, the processing operation of the main routine from the mode processing routine 300 to the present position computing routine 400 is repeatedly executed in cycles of several tens of msec.

Figure 8:
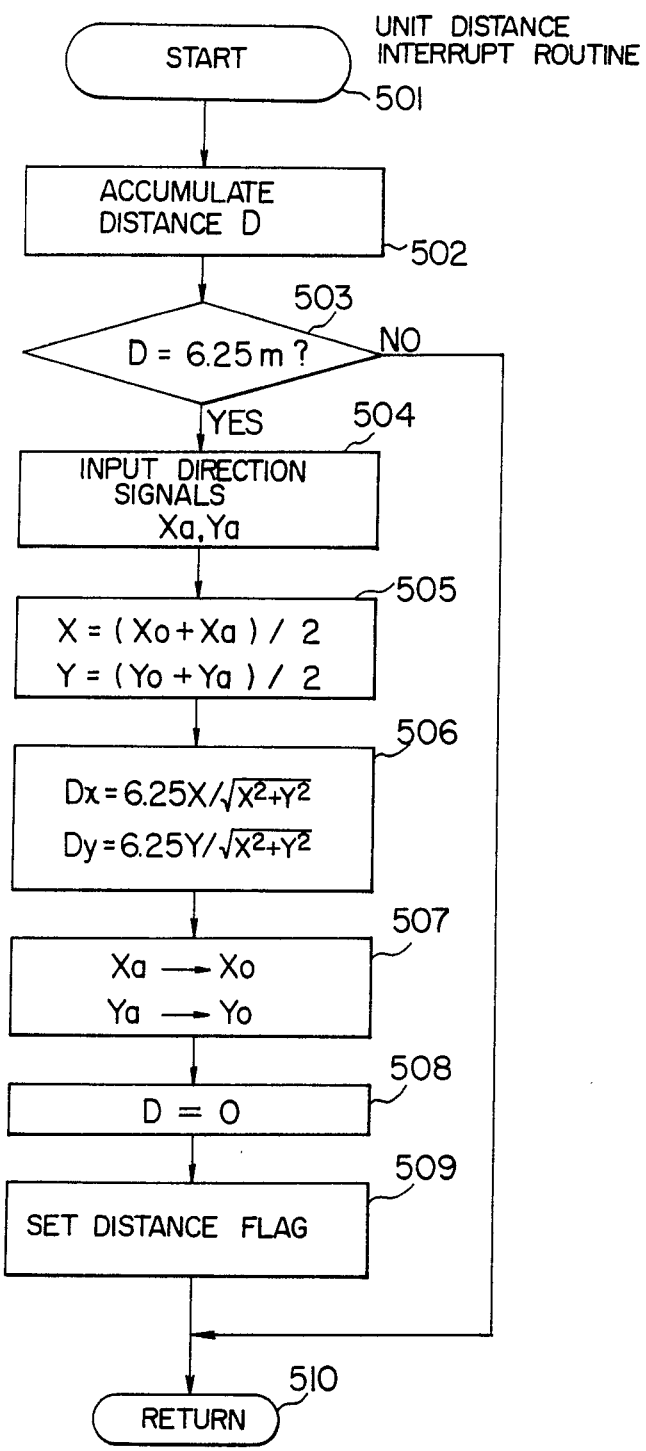
FIG. 8 is a flowchart showing the processing operation of an interruption processing routine based on a distance pulse from the distance sensor.

If the distance pulse from the distance sensor 2 is applied to the interruption terminal (INT) of the microcomputer 4 during the repetitive operation of the main routine, the processing operation of the main routine is temporarily suspended thereby to execute the interruption processing operation shown in FIG. 8. Specifically, the processing operation is started at the interruption start step 501, followed by the accumulation step 502 for updating by accumulation of the unit distance data (equivalent to about 39.2 cm) on the distance data D stored in the RAM 4c, followed by the distance decision step 503 for deciding whether or not the distance data D has reached the length of 6.25 m. If the distance data has not reached 6.25 m, the decision is "No", and the process proceeds to the return step 510. In the case where the distance data D has reached 6.25 m, on the other hand, the decision is "Yes", so that the process is passed to the direction signal input step 504. At this direction signal input step 504, the digital X and Y component signals Xa and Ya (positive for east and north, and negative for west and south) are received from the direction sensor 1, followed by the average direction computing step 505 for determining the average direction data X, Y from the preceding direction data Xc, Yc (the direction data before the coverage of 6.25 m) and the present direction data Xa, Ya. The process then proceeds to the distance component computing step 506 for determining the X distance component Dx as $6.25X/\sqrt{X^2+Y^2}$, and the Y distance component Dy as $6.25Y/\sqrt{X^2+Y^2}$ ($X/\sqrt{X^2+Y^2}$ equivalent to $\cos\theta$ of the angle $\theta$ in the counterclockwise direction with respect to the east, and $Y/\sqrt{X^2+Y^2}$ to $\sin\theta$ thereof), followed by the memory step 507 where the present direction data Xa, Ya is stored as Xo, Yo for the next case. At the distance data reset step 508, the distance data D is reset to zero, followed by the step distance flag set step 509 for setting the distance flag. The process then proceeds to the return step 510, where the main routine temporarily suspended is restored. In other words, the interruption computing routine is such that the distanced data D is updated by accumulation for each coverage of the unit distance, and when the distance data reaches 6.25 m, the corresponding X, Y distance components Dx, Dy are computed, thereby executing the processing operation for setting the distance flag.

Now, the processing operation of the mode processing routine 300 in the main routine will be explained in detail. In the mode processing routine 300, the processing operation is started from the touch data input step 301 where the touch data from the touch panel 7 is received and stored in the RMA 4c. The process is passed to the map mode decision step 302 for deciding whether or not the mode area in RMA 4c contains the map mode, and if the map mode is involved, the decision is "Yes", so that the process proceeds to the mode change decision step 303 for deciding whether or not the touch data stored in RAM 4c provides data indicating the mode change (the data obtained when the touch area of 34 is depressed in FIG. 3). If the touch data is the one indicating the mode change, the decision is "Yes", so that the process proceeds to the character mode set step 304 for setting the mode area to the character mode, followed by the character switch signal output step 305 for generating in the video controller 26 of the CRT controller 5 a character switch signal for displaying the character image on the CRT display unit 6, thus completing one processing operation of the mode processing routine 300.

On the other hand, assume that the touch data is not the one indicating the mode change, or it is the data obtained by depressing a touch area other than 34 in FIG. 3 or the data obtained when none of the touch areas is depressed (such as FF) is involved. The decision at the mode change decision step 303 is "No", and the process proceeds to the cursor move decision step 306. The cursor move decision step 306 decides whether or not the above-mentioned touch data is the one obtained by depressing any of the touch data 32, 33, 35, 38, 40 and 41 (the data for cursor move), and if the touch data is not the data for cursor movement, the decision is "No", thus ending one processing operation of the mode processing routine 300. If the touch data is the one for cursor movement, on the other hand, the decision is "Yes" and the process is passed to the cursor move processing step 307. The cursor move processing step 307 changes the content of the second graphic memory 22 of the CRT controller 5 in such a manner as to move the cursor for the present position indicated on the CRT display unit northward by a predetermined length if the touch data involved is associated with the depression of the touch area 32 or 33; move the cursor westward by a predetermined length if the touch data is associated with the depression of the touch area 35; move the cursor southward by a predetermined length if the touch data is associated with the depression of the touch area 40 or 41; and move the cursor eastward by a predetermined length if the touch data is associated with the depression of the touch area 38. The coordinate of the display position on the screen by cursor is stored in RAM 4c as the X, Y coordinate data of the upper right corner of the map.

The cursor move processing step 307 is followed by the map update decision step 308. At this map update decision step 308, it is decided whether or not the display position is located on the periphery of the CRT screen on the basis of the X, Y coordinate data of the display position stored in the RAM 4c, that is, whether or not X, Y coordinate data of the display position is located in the A, B, C, D, E, F, G or H portion shown in FIG. 12. If the display position is not located in any of the portions, the decision is "No", thus ending one processing operation of the mode processing routine 300. When the display position is located in any one of the peripheral portions, on the other hand, the decision is "Yes", and the process proceeds to the map update processing step 309. This map update processing step 309 executes a processing operation for selecting an adjacent map number corresponding to the portion containing the display position mentioned above. If the map number of the present map is 33 as shown in FIG. 11, for example, the eight map numbers including 23, 24, 34, 44, 43, 42, 32 and 22 are stored in RAM 4c as the adjacent map numbers. In the case where the present position is located at point a as shown in FIG. 12, number 34 is selected from the value of the X, Y coordinate data, and if the present position is located at point b, the number 23 is selected as the map number of the map to be indicated in the next case. On the map number thus selected, the processing operations from the data conversion step 312 to the map switch signal output step 314 (the detail of which will be described later) are executed thereby to update the present map to an adjacent map and to change the running route. In response to the selection of the map number 34, new adjacent map number data of 23, 24, 25, 35, 45, 44, 43 and 33 are provided, or if the number 23 is selected, numbers 12, 13, 14, 24, 34, 33, 32 and 22 are provided. Each adjacent map is set in the map data in such a way that small marginal portions are superposed on each other.

If the decision at the map mode decision step 302 is "No", by contrast, the process proceeds to the mode change decision step 310 for deciding whether or not the mode should be changed by the processing operation similar to the mode change decision step 303. If it is time to change the mode and the decision is "Yes", the process is passed to the map mode set step 311, where the content of the mode area in the RAM 4c is set to the map mode, followed by the data conversion step 312 for converting the running route data of the second graphic memory 22 of the CRT controller 5. In this case, first, the reader 3 is controlled to search for a designated area by the map number thereof, and a coordinate change value is computed from the absolute coordinate of the map of the designated area (stored in the map laterial displacement section 64 and the map vertical displacement section 65 in FIG. 5) and the absolute coordinate data in the map of the preceding area. According to this value, the running locus and the present position data in the second graphic memory 22 are corrected, while at the same time converting the X, Y coordinate data of the display position in the RAM 4c. The process is then passed to the map data read output step 313 where the adjacent map number data of the cassette tape 3a and the map data are received through the reader 3 and the adjacent map number data is stored in RAM 4c, while producing the map data to the first graphic memory 21. The process is passed to the map switch signal output step 314 for generating in the video controller 26 a map switch signal for displaying a graphic image of the map on the CRT display unit 6, thus completing one processing operation of the mode processing routine 300. In other words, when switching from a character image to a graphic image of a map different from the preceding case, the above-mentioned processing operation is executed and the present map data is stored in the first graphic memory 21, while changing the content of the second graphic memory 22 in a manner to correct the cursor indicating the running locus and the present position to the present position corresponding to the particular map. By doing so, it is possible to display the running locus and the present position at the portion corresponding to the map involved even when the map displayed on the CRT display unit 6 is changed.

When the decision at the mode change decision step 310 is "No", by contrast, the process is passed to the character processing step 315. When the character processing step 315 is reached, the character mode is set and the character switch signal is applied to the video controller 26, and therefore the character image as shown in FIG. 6 is displayed on the CRT display unit 6. The numerals 02-4-68 shown at the central part of the character image designate the district, region and the area respectively which numbers are added by one each by the increment switch 81, subtracted by one each by the decrement switch 82, set by the set switch 83 and reset by the reset switch 84 at the character processing step 315. The map number based on this numeral data of the district, region and area is stored in RAM 4c. The switch 81, 82, 83 and 84 correspond to the touch areas 39, 40, 41 and 42 in FIG. 3 respectively.

Figure 9:
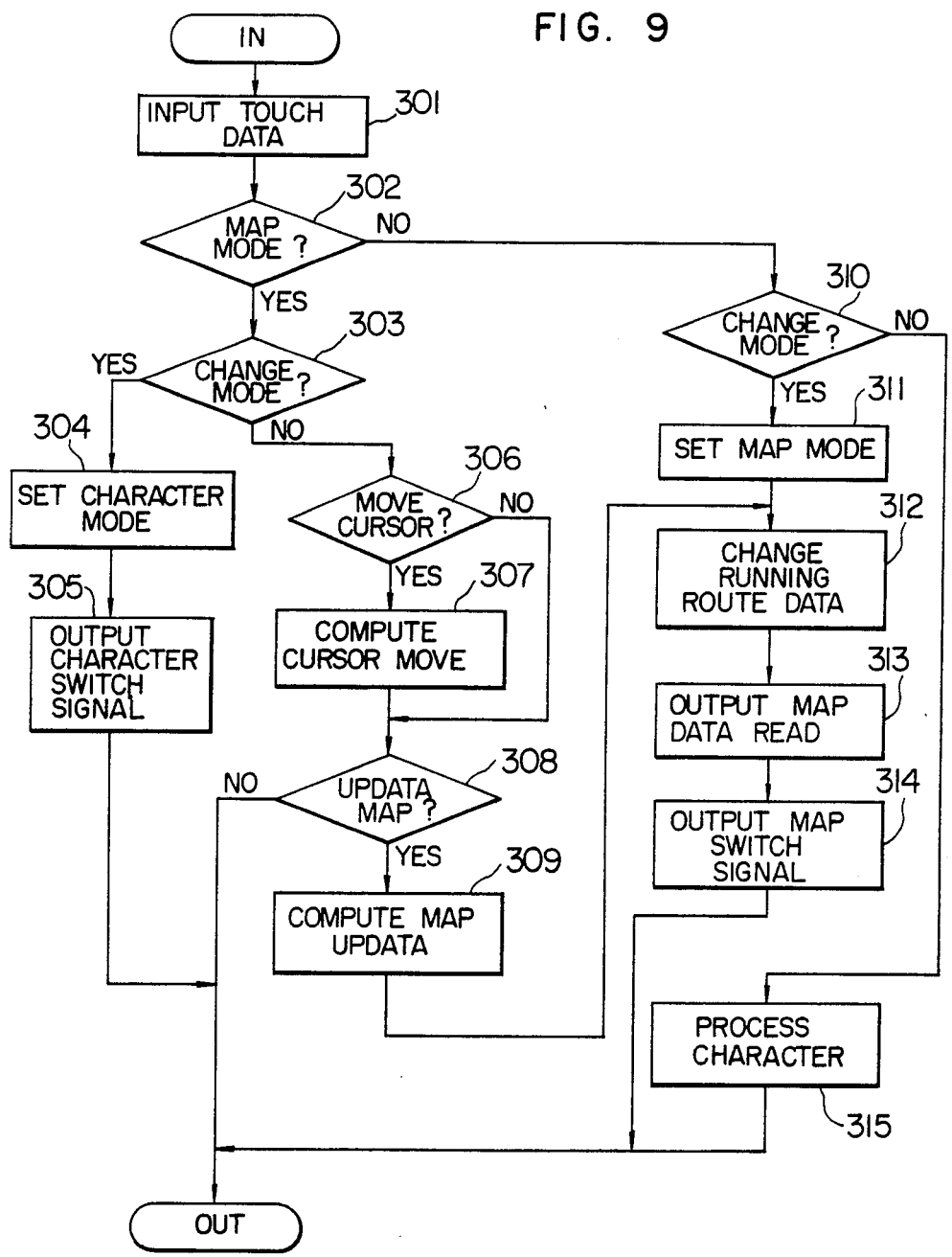
FIG. 9 is a flowchart showing a detailed processing operation of the mode processing routine in FIG. 7.

Specifically, in the mode processing routine 300 shown in FIG. 9, the operations (1 to (5) described below are performed in accordance with the contents of the touch data from the touch panel 7 and the mode area of RAM 4c.

(1) If a cursor move command is issued without any mode change in map mode, the processing operation for moving the cursor is executed, while in the absence of the cursor move command, the map display is continued.

(2) If a decision is made on map update in map mode, the processing operation for updating the map is executed, and the graphic image of the map is changed on the display unit 6, while at the same time correcting and displaying the running locus and the present position. Also, upon decision of non-update of the map, on the other hand, the map display is continued.

(3) If a mode change command is issued in map mode, the map mode is changed to the character mode thereby to display the character image on the CRT display unit 6.

Figure 6:
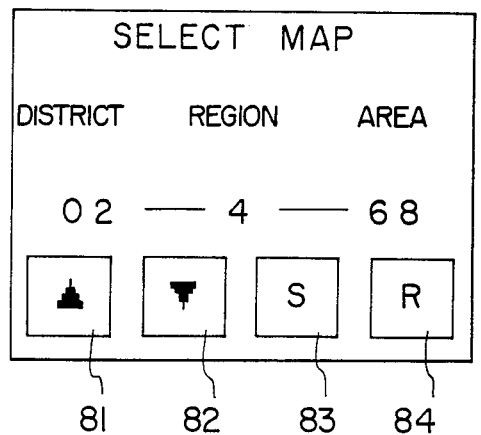
FIG. 6 is a diagram for explaining the display conditions of a CRT display unit.
Figure 7:
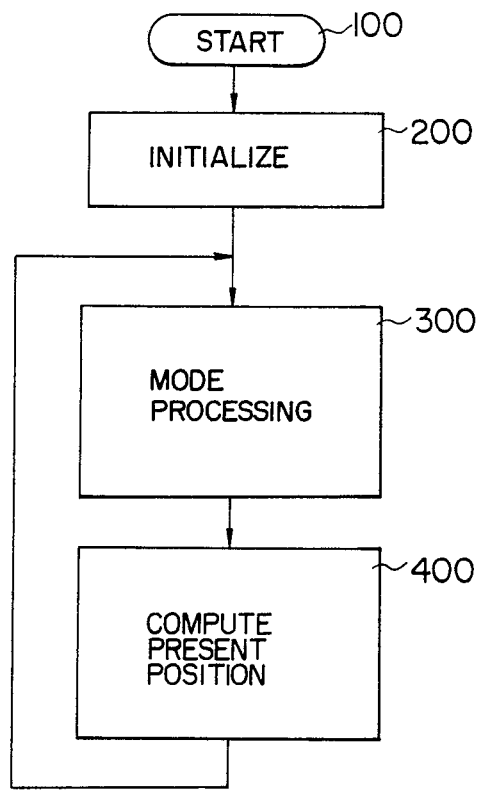
FIG. 7 is a flowchart showing the general processing operation of the main routine of a microcomputer.

(4) If a mode change is not involved in character mode, the change of the map is acceptable for the character image as shown in FIG. 6.

(5) If a mode change command is issued in character mode, the character mode is changed to the map mode on the one hand and the graphic image of the map is displayed on the CRT display unit on the other hand, while at the same time correcting and displaying the running locus and the present position.

Now, the processing operation of the present position computing routine 400 in the main routine will be explained in detail. In this present position computing routine 400, the processing operation is started from the distance flag decision step 401 of FIG. 10, and decision is made as to whether or not the distance flag is set by the interruption processing operation of FIG. 8. If the distance flag is not set, the decision is "No", thus completing one processing operation of the present position computing routine 400. If the distance flag is set, on the other hand, the decision is "Yes" so that the process proceeds to the X distance correction step 402. At the X distance correction step 402, the X distance data DX is determined by corrective computation from the X distance component Dx obtained by the interruption processing operation (DX=DX+Dx), and at the Y distance correction step 403, the Y distance data DY is determined by a similar corrective computation (DY=-DY+Dy), thereby deciding whether or not the X distance data DX has exceeded the value of 50 m at the first X distance decision step 404. If the X distance data DX is 50 m or more, the decision is "Yes", and the process is passed to the X axis right end decision step 405 for deciding whether or not the display position takes a value displaced toward the right end from the display image on the basis of the X coordinate data of the display position stored in RAM 4c. If the X coordinate data is not a value displaced so, the decision is "No" and the process proceeds to the X distance subtraction step 406, where the value of 50 m is subtracted from the X distance data DX, followed by the display move step 407 for moving the present position data in the second graphic memory 22 by 50 m eastward in positive direction, while at the same time causing the running locus data to follow such a movement.

If the decision at the first X distance decision step 404 is "No", on the other hand, the process proceeds to the second X distance decision step 408, where it is decided whether or not the X distance date DX is reduced below −50 m. If the X distance data DX takes a value −50 m or lower, the decision is "Yes", and the process is passed to the X axis left end decision step 409 for deciding whether or not the display position takes a value displaced toward the left end from the display image on the basis of the X coordinate data of the display position stored in RAM 4c. If the X coordinate data is not a value displaced so, the decision is "No" and the process is passed to the X distance add step 410 for adding 50 m to the X distance data DX, followed by the display move step 411 for moving the present position data in the second graphic memory 22 by 50 m westward in negative direction while at the same time causing the running locus data to follow such a movement.

In the case where the decision at the second distance decision step 408 is "No", or the decision at the X axis right end decision step 405 or the X axis left end decision step 409 is "Yes" or following the display move step 407 or 411, the process is passed to the Y component display move processing routine 412, so that the decision and the processing operation similar to the steps 404 to 411 are executed for the Y distance data DY computed at the Y distance correction step 403. (If the display position is located within the upper and lower display images when the Y distance data DY is at more than 50 m in positive or negative direction, the present position data and the running locus data in the second graphic memory 22 are moved by the length equivalent to 50 m in the corresponding direction.) The process is then passed to the next distance flag set step 411 for resetting the distance flag. At the time of a change of the present position data and the running locus data in the present position computing routine 400, the X, Y coordinate data of the display position in the RAM 4c is also changed in similar way.

Figure 10:
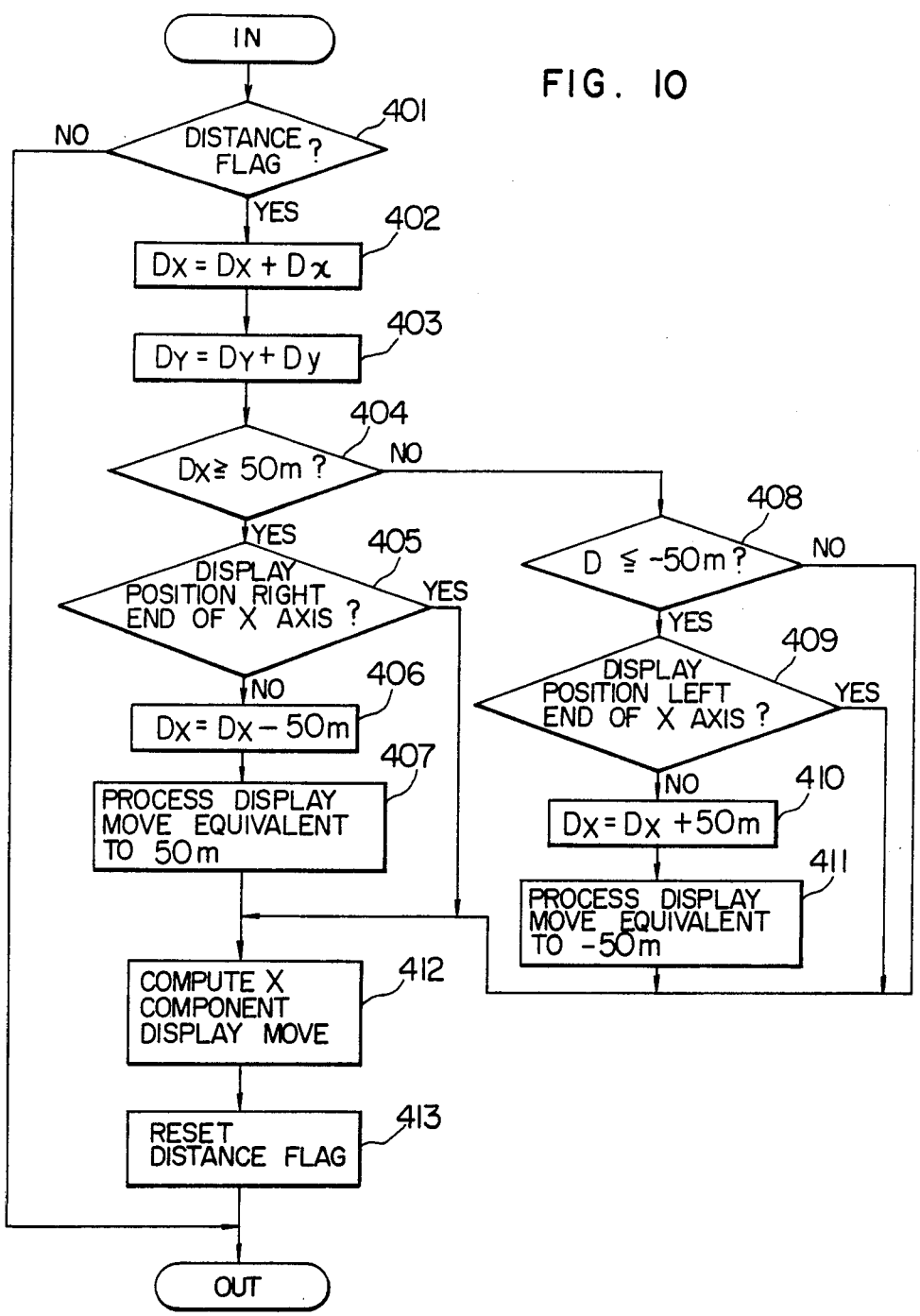
FIG. 10 is a flowchart showing a detailed processing operation of the present position computing routine in FIG. 7.

Specifically, in the present position computing routine 400 shown in FIG. 10, regardless of the image displayed on the CRT display unit 6, the present position data and the running locus data in the second graphic memory 22 are changed.

The repetitive processing of the main routine by the mode processing routine 300 and the present position computing routine 400 and the interruption processing of FIG. 8 sequentially change the present position data and the running locus data in the second graphic memory 22. At the same time, the image on the CRT display unit 6 is selected according to the designated mode, so that if the map mode is involved, the graphic image of the map (including the display of the present position and the running locus) is displayed, while if the character mode is involved, the character image for map designation shown in FIG. 6 is displayed.

Another embodiment of the map update decision step 308 and the map update processing step 309 shown in FIG. 9 will be explained with reference to FIG. 13. If the decision at the cursor move decision step 306 is "No", or following the cursor move processing step 307, the process is passed to the present position computing step 601 of FIG. 13. The present position computing step 601, by use of the difference between the reference point and the present position on the map, computes and determines whether the present position is located in the central portion I, peripheral portions A to H or out of the map J in FIG. 12, and the result of computation is stored as the present portion in RAM 4c. If the portion changes, the preceding portion is stored as such in RAM 4c. The process then proceeds to the present position J decision step 602 for deciding whether or not the present position is located out of the map J or not. If the present position is located out of map J, the process is passed to the map update processing step 605 for processing the map number of the next display. If the present position is located in the map portions A to I, on the other hand, the process is passed to the present position I decision step 603 for deciding whether the present position is located in the central portion I or not. If the present position is located in the central portion I, the process is passed to the routine 400 shown in FIG. 10. In the case where the present position is located in the peripheral portions A to H, by contrast, the process proceeds to the preceding portion decision step 604 for deciding whether or not the preceding portion is the central portion I. If the preceding portion is not the central portion but the pheripheral portions A to H, the process is passed to the routine 400. If the preceding portion is the central portion I, by contrast, the process is passed to the map update processing step 605 for computing the number of the map to be displayed the next time from the number of the map on display. Assume, for instance, that the present map is No. 33 shown in FIG. 11, and that the map update processing step 605 is reached when the present position has reached the point a in FIG. 12. Since the present portion is C, No. 34 to the right of No. 33 shown in FIG. 11 is taken as the number of the map to be displayed the next time. In similar fashion, if the map update processing step 605 is reached when the present position is at point b, No. 23 above No. 33 is selected. Further, if the map update processing step 605 is reached when the present position is at point c, the nearest region C of the peripheral portions A to H is determined and No. 34 to the right of No. 33 is selected in view of the fact that the point c is located out of map J.

Figure 13:
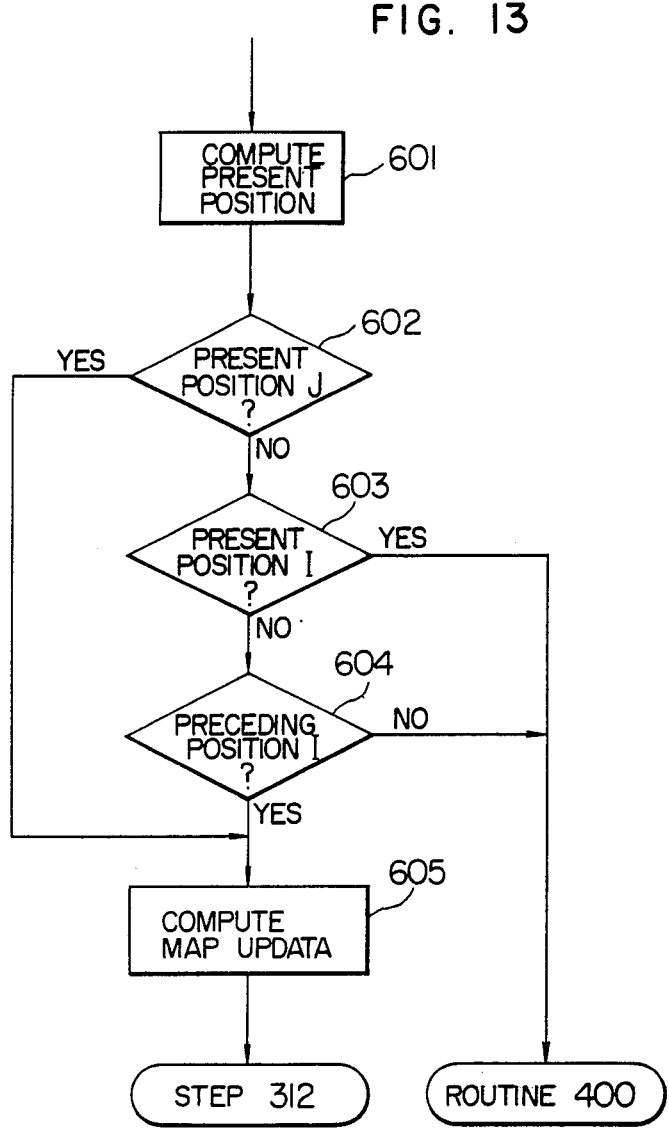
FIG. 13 is a flowchart showing a second embodiment.

In this way, the processing operation of FIG. 13 is such that if the present position is relocated from the central portion I to any of the peripheral portions A to H, or located out of map region J from the beginning, the map is updated, while if the present position is located in any of the peripheral portions A to H from the beginning, the map is not updated.

Now, explanation will be made of the detailed processing operation of the mode processing routine 300 of the main routine according to a third embodiment of the present invention. At this mode processing step 300, the processing operation thereof is started from the touch data input step 301 of FIG. 14 thereby to receive and store the touch data from the touch panel 7 in the RAM 4c. The process is then passed to the map mode decision step 302 for deciding whether or not the content of the mode area in RAM 4c is the map mode, and if the map mode is involved, the decision thereof is "Yes" so that the process proceeds to the mode change decision step 303 for deciding whether or not the touch data stored in the RAM 4c is the data indicating the change of mode (the data obtained when touch area 34 in FIG. 3 is depressed). If the touch data is the one indicating the mode change, the decision is "Yes", so that the process is passed to the character mode set step 304, where the content of the above-mentioned mode area is set to the character mode, followed by the character switch signal output step 305, where the character switch signal for displaying the character image on the CRT display unit 6 is generated in the video controller 26 of the CRT controller 5, thus completing one processing operation of the mode processing routine 300.

In the event that the above-mentioned touch data is not the data indicating a mode change, by contrast, namely, in the event that it is the data obtained by depressing a touch area other than 34 in FIG. 3 or it is the data obtained when none of the touch areas is depressed (such as data FF), the decision at the mode change decision step 303 is "No", and the process is passed to the cursor move decision step 306. The cursor move decision step 306 decides whether or not the above-mentioned touch data is the one obtained by depressing any of the touch areas 32, 33, 35, 38, 40 and 41 (the data for cursor movement), and if the touch data is not the data for cursor movement, the decision is "No", so that one processing operation of the mode processing routine 300 is completed. If the touch data is the one for cursor movement, on the other hand, the decision is "Yes", so that the process is passed to the cursor move processing step 307. At the cursor move processing step 307, if the touch data is the one obtained by depressing the touch area 32 or 33, the content of the second graphic memory 22 of the CRT controller 5 is changed in such a way as to move the cursor of the present position displayed on the CRT display unit 6 by a predetermined distance northward. In similar manner, the content of the second graphic memory 22 of the CRT controller 5 is changed in such a way that if the touch data is the one obtained by depressing the touch area 35, the cursor is moved westward; if the touch data is the one obtained by depressing the touch area 40 or 41, the cursor is moved southward; and if the touch data is the one obtained by depressing the touch area 38, the cursor is moved eastward respectively by a predetermined length. The display position on the display panel by cursor is stored in RAM 4c as the X, Y coordinate data for the upper right corner of the map.

The cursor move processing step 307 is followed by the map update switch decision step 3080. The map update switch decision step 3080 decides whether or not an input is received by the switching operation of the map update switch 8, and if the decision is "No" in the absence of an input, one processing operation of the mode processing routine 300 is completed. If the decision thereof is "Yes" in the presence of an input, by contrast, the process is passed to the map update decision step 308. At this map update decision step 308, it is decided whether or not the display position is located in the peripheral portions of the CRT screen on the basis of the X, Y coordinate data of the display position stored in the RAM 4c, and if the display position is not located in the peripheral portions resulting in the decision "No", one processing operation of the mode processing routine 300 is completed. If the decision is "Yes", on the other hand, the process is passed to the map update processing step 309. The map update processing step 309 performs the processing operation for selecting the map number of an adjacent map from the X, Y coordinate data of the display position stored in the RAM 4c. As shown in FIG. 11, for instance, assuming that the number of the present map is 33, eight map numbers including 23, 24, 34, 44, 43, 42, 32 and 22 are stored in RAM 4c as the adjacent map number information. If the present position is located at point a as shown in FIG. 15, No. 34 is selected from the X, Y coordinate data, while if the present position is located at point b, No. 23 is selected as the number of the map to be displayed next. Specifically, the periphery of the CRT screen is divided into eight portions A to H of which the map number of the portion having the display position therein is selected. On the basis of the map number thus selected, the processing operations from the data conversion step 312 to the map switch signal output step 314 are performed (as the detail thereof is described later) for updating the map to the adjacent map and conversion of the running route. In response to the selection of the map number 34, the numbers 23, 24, 25, 35, 45, 44, 43 and 33 are newly supplied as new adjacent map number information, while in response to the selection of the map number 23, the numbers 12, 13, 14, 24, 34, 33, 32 and 22 are newly supplied as adjacent map number information. Map data are set in such a manner that respective adjacent maps are superposed slightly in marginal parts thereof on each other.

If the decision at the map mode decision step 302 is "No", by contrast, the process is passed to the mode change decision step 310, for deciding, as at the mode change decision step 303, whether or not the mode should be changed. If the decision is "Yes" as it is time to change the mode, the process proceeds to the map mode set step 311 for setting the content of the mode area in RAM 4c to the map mode, followed by the data conversion step 312 for converting the running route data of the second graphic memory 22 in the CRT controller 5. First, the reader 3 is controlled to search for the designated area by the map number thereof so that the coordinate conversion value is computed from the absolute coordinate in the map of the area thus searched for (stored in the map lateral displacement section 64 and the map vertical displacement section 65 in FIG. 5) and the absolute coordinate data in the map of the preceding area. According to the resulting value thus obtained, the data on the running locus and the present position in the corrected graphic memory 22 are changed to while at the same time changing the X, Y coordinate data of the display position in RAM 4c. The process is then passed to the data read step 314 for receiving the adjacent map number data and the map data of the cassette tape 3a through the reader 3, while at the same time storing the adjacent map number data in RAM 4c and producing the map data to the first graphic memory 21. The process proceeds to the map switch signal output step 314 for causing the video controller 26 to generate a map switch signal for displaying a graphic image of the map on the CRT display unit 6, thus completing one processing operation of the mode processing routine 300. Specifically, if the character image is to be switched to a graphic image of another map different from the preceding case, the above-mentioned processing operation is executed, so that the present map data is stored in the first graphic memory 21 while at the same time changing the content of the second graphic memory 22 in such a manner as to correct the cursor indicating the present position and the running locus at the present position corresponding to the map. By doing so, it is possible to display the running locus and the present position at a part corresponding to the map involved even when the map to be displayed on the CRT display unit 6 is changed.

In the case where the decision at the mode change decision step 310 is "No", on the other hand, the process is passed to the character processing step 315. When the character processing step 315 is reached, the character mode is set already and the character switch signal is generated in the video controller 26, so that the CRT display unit 6 displays the character image as shown in FIG. 6. The numerals 02-4-68 at the central part of the character screen designate the district, region and area respectively, which are updated by being added by one by the increment switch 81, or by being subtracted by one by the decrement switch 82 set by the set switch 83, or reset by the reset switch 84 through the processing operation at the character processing step 316. The numeral data of the district, region and area, namely, the map number is stored in RAM 4c. The switches 81, 82, 83 and 84 correspond to the touch areas 39, 40, 41 and 42 respectively in FIG. 3.

Figure 14:
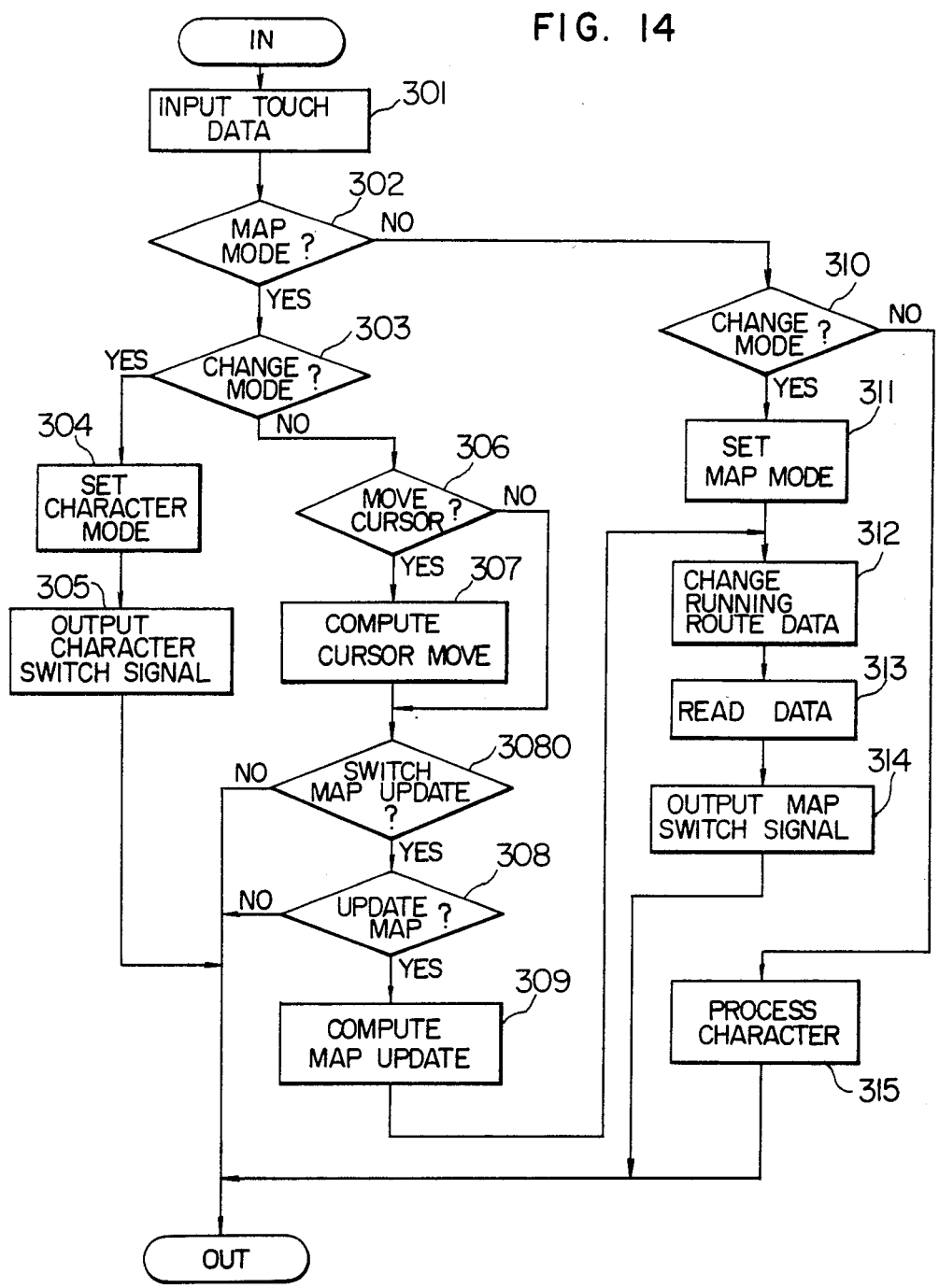
FIG. 14 is a flowchart showing a detailed processing operation of the mode processing routine according to a third embodiment.

In this way, at the mode processing routine 300 shown in FIG. 14, the following operations (1) to (5) are performed in accordance with the touch data from the touch panel 7, the input from the map update switch 8 and the content of the mode area of RAM 4c:

(1) If the map mode is involved without any mode change, the processing operation for cursor movement is executed in the presence of a cursor move command, while in the absence of a cursor move command, the map display is continued.

(2) If the map mode is involved in the presence of the map update command, the processing operation for map update is executed, so that the graphic image of the map on the CRT display unit 6 is changed while at the same time correcting and displaying the running locus and the present position. In the absence of the map update command, the map display is continued.

(3) If a mode change command is issued in the map mode, the map mode is changed to the character mode while at the same time displaying the character image on the CRT display unit 6.

(4) If the character mode is involved without mode change, the change of the map is acceptable for the character image as shown in FIG. 6.

(5) If a mode change command is issued in the character mode, the character mode is changed to the map mode while at the same time displaying the graphic image of the map on the CRT display unit 6 on the one hand and displaying by correction the running locus and the present position on the other hand.

Figure 16:
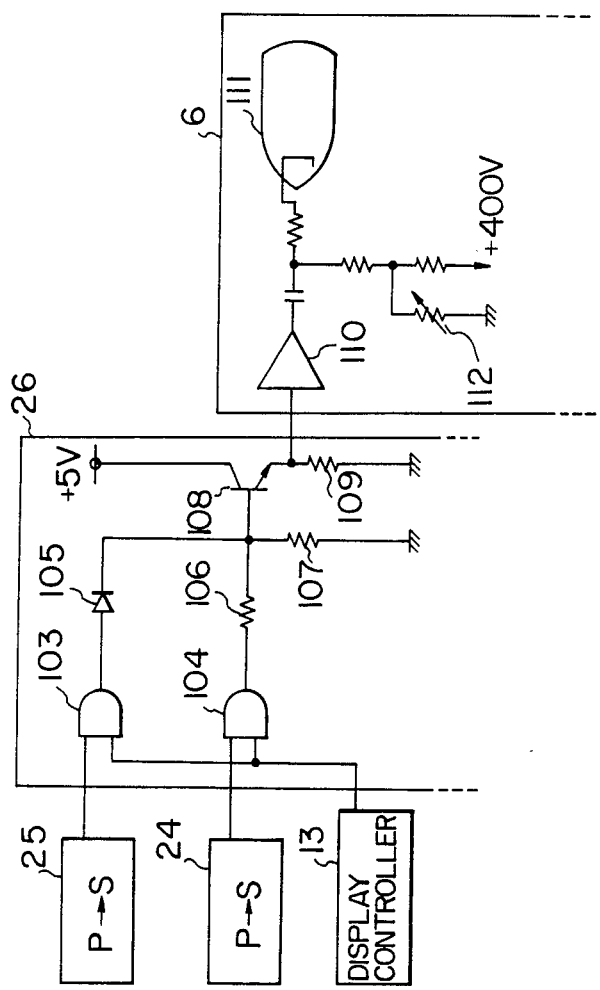
FIG. 16 is a diagram showing a detailed electric connection of the essential parts of a video controller and a CRT display unit in FIG. 1.

Now, explanation will be made of the electric connection diagram of the essential parts of the video controller 26 and the CRT display unit 6 shown in FIG. 16. Numerals 103 and 104 designate AND circuits for controlling the display data from the parallel-serial converters 24 and 25 at the display timing of the display controller 13. Numeral 105 designates a diode, and numerals 106, 107 resistors for converting the output of the AND circuits 103 and 104 into a video signal of a three-value voltage level. Numeral 108 designates a transistor and numeral 109 a resistor making up an emitter-follower circuit for applying a video signal to the CRT display unit 6 at a low-output impedance.

Numeral 110 designates a video amplifier circuit, and numeral 111 a monochromatic cathode-ray tube for converting an electrical signal into light. Numeral 112 designates a variable resistor operated by the driver or the like for controlling the brightness of the monochromatic cathode-ray tube 111.

In this construction, the data on the road map is stored in the first graphic memory 21 and is produced as an output voltage of the AND circuit 104 in the form of serial data through the parallel-serial converter 24. When this output voltage is "high", the base of the transistor 108 is impressed with a voltage substantially equal to the voltage divided by the resistors 106 and 107, which voltage takes a value intermediate "high" and "low". The data on the running route is stored in the second graphic memory 22, and is produced as an output voltage of the AND circuit 103 in the form of serial data through the parallel-serial converter 25. When this output is "high", the base of the transistor 108 is raised to "high" through the diode 105.

Specifically, the emitter of the transistor 108 produces a three-value voltage level signal (video signal) including a "high" signal for the running locus, a "middle" signal for the road map, and a "low" signal in the absence of the running locus and the road map. This video signal is amplified at the video amplifier circuit 110 and applied to the cathode of the cathode-ray tube 111 thereby to effect a display with a brightness difference. Since the DC level of the cathode can be changed by the variable resistor 112, it is possible to change the brightness or brightness difference of the road map display and the running route display in accordance with the shade of the surrounding atmosphere or the propensity of the user, or to display only the running route without displaying the road map.

We claim:

1. A vehicle-mounted navigator comprising:

distance sensor means for detecting the running distance of the vehicle;

direction sensor means for detecting the travelling direction of the vehicle;

calculation means responsive to detection signals from said distance sensor means and said direction sensor means for calculating a present position of the vehicle;

memory means for storing map data including a plurality of road maps corresponding to the vehicle's travelling regions;

display means for electronically displaying a road map corresponding to one of said plurality of travelling regions on a display surface thereof;

present position display control means for allowing said display means to display the present position of the vehicle calculated by said calculation means on the road map displayed on the display surface thereof;

decision means for deciding whether the present position of the vehicle displayed on said display surface exists in one of a plurality of adjacent regions located in the periphery of said display surface;

road map display control means for reading the map data of the adjacent region corresponding to the decided adjacent region from said memory means and for allowing said display means to display the road map of the adjacent region adjacent to the presently displayed vehicle travelling region instead of the display of the present road map, when said decision means decides that the displayed present position exists in one of said adjacent regions; and correction means for automatically correcting said displayed present position in accordance with the positional relation between the presently displayed region and the adjacent region which is to be displayed, when said road map display control means changes the display of the presently displayed road map to the adjacent region.

2. A vehicle-mounted navigator according to claim 1, wherein:

said memory means stores the map data corresponding to the plurality of vehicle travelling regions and stores position data indicative of the positional relation among respective travelling regions; and said correction means corrects said displayed present position on the basis of said position data indicating the positional relation between the presently displayed region and the adjacent region which is to be displayed.

3. A vehicle-mounted navigator according to claim 2, wherein:

said position data includes coordinate data indicating a coordinate between a given position and a predetermined specific point at the respective travelling regions; and said correction means decides a coordinate conversion value on the basis of respective coordinate data of the presently displayed region and the adjacent region which is to be displayed and corrects said displayed present position on the basis of said coordinate conversion value.

4. A vehicle-mounted navigator according to claim 1, wherein:

said memory means stores, in addition to the map data corresponding to a plurality of the vehicle travelling regions, a map numeral of the present travelling region and a map numeral for each one of the plurality of travelling regions adjacent to the present travelling region; and said road map display control means reads the map data of the adjacent region from the map numeral corresponding to the adjacent region at which the displayed present position exists.

5. A vehicle-mounted navigator comprising:

distance detection means for detecting a running distance of the vehicle;

direction detection means for detecting a travelling direction of the vehicle;

calculation means responsive to detection signals from said distance detection means and said direction detection means for calculating the present position of the vehicle;

memory means for storing map data including a plurality of road map corresponding to the vehicle travelling regions;

display means for electronically displaying a road map corresponding to one of said plurality of vehicle travelling regions on a display surface thereof;

present position display control means for allowing said display means to display the present position calculated by said calculation means on the road map displayed on the display surface;

alternation command means for generating a command for map alternation;

road map display control means responsive to the alternation command of said alternation command means for selecting one adjacent region to be displayed from a plurality of adjacent regions adjacent to the presently displayed vehicle travelling region in accordance with the positional relation between the displayed present position of the vehicle and the periphery of said display surface, for reading the map data of the adjacent region from said memory means, and for allowing said display means to display the road map of the adjacent region instead of the presently displayed road map; and correction means for automatically correcting the displayed present position of the vehicle in accordance with the positional relation between the presently displayed region and the adjacent region which is to be displayed, when road map display control means changes the display of the said road map from the presently displayed region to that of the adjacent region.

6. A vehicle-mounted navigator according to claim 5, further comprising:

decision means for deciding whether the present position of the vehicle displayed on said display surface exists in one of a plurality of adjacent regions located in the periphery of said display surface; and wherein said road map display control means selects the adjacent region which is to be displayed in accordance with the decided adjacent region, when said alternation command means generates the alternation command and said decision means decides that said displayed present position exists on any one of said adjacent regions.

7. A vehicle-mounted navigator according to claim 5 wherein:

said memory menas stores the map data corresponding to the plurality of vehicle travelling regions and further stores position data indicating the positional relation among respective vehicle travelling regions; and said correction means corrects said displayed present position on the basis of said position data indicating the positional relation between the presently displayed vehicle travelling region and the adjacent vehicle travelling region which is to be displayed.

8. A vehicle-mounted navigator according to claim 7, wherein:

said position data includes coordinate data indicating a coordinate between a given position and a predetermined specific point at the respective vehicle travelling regions; and said correction means decides a coordinate conversion value on the basis of respective coordinate data of the presently displayed region and the adjacent region which is to be displayed and corrects said displayed present position on the basis of said coordinate conversion value.

9. A vehicle-mounted navigator according to claim 5, wherein:

memory means stores, in addition to the data map corresponding to the plurality of vehicle travelling regions, a map number for the vehicle's present travelling region and a map numeral for each one of a plurality of travelling regions adjacent to the vehicle present travelling region; and said road map display control means reads the map data of the adjacent section from the map numeral corresponding to the adjacent region where the displayed present portion exists.

10. A vehicle-mounted navigator according to claim 6 wherein:

said memory means stores the map data corresponding to the plurality of vehicle travelling regions and further stores position data indicating the positional relation among respective vehicle travelling regions; and said correction means corrects said displayed present position on the basis of said position data indicating the positional relation between the presently displayed vehicle travelling region and the adjacent vehicle travelling region which is to be displayed.

* * * * *